Dec. 29, 1936.  C. R. FISH, JR  2,065,678
GARDEN TOOL
Filed July 17, 1935
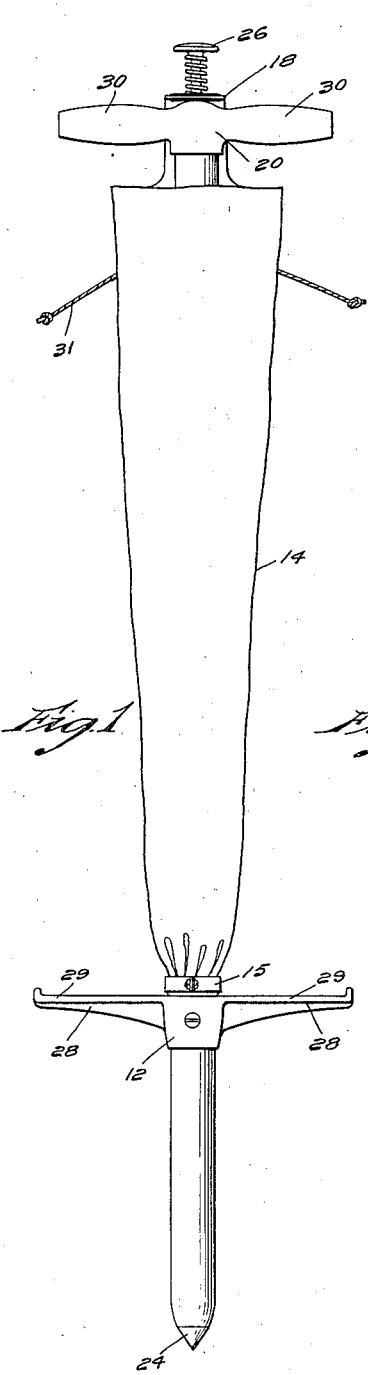
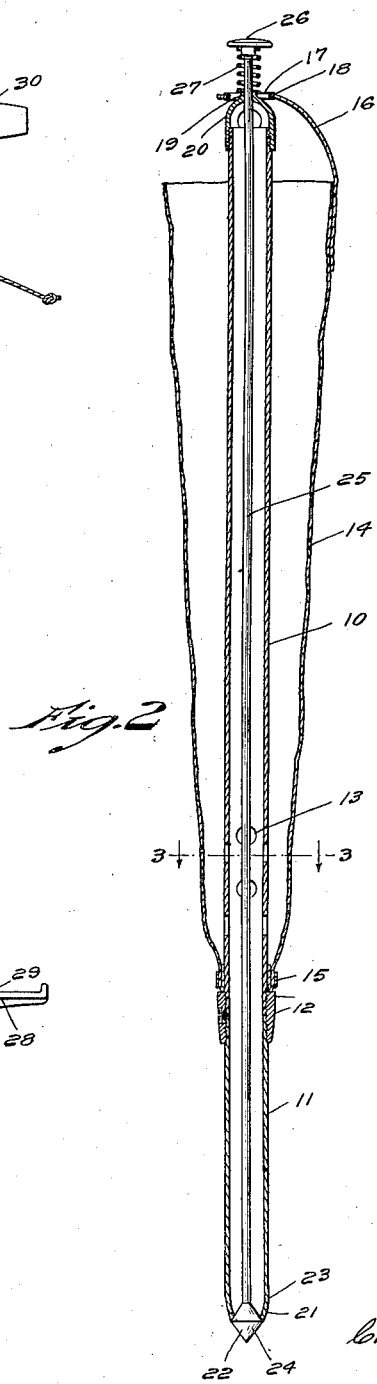
Fig.3
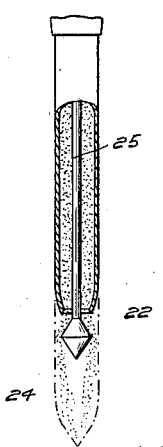
Fig.4
Inventor
Charles R. Fish, Jr.
By Horatio E. Bellows
Attorney Patented Dec. 29, 1936

2,065,678

UNITED STATES PATENT OFFICE 2,065,678

GARDEN TOOL

Charles R. Fish, Jr., Worcester, Mass.

Application July 17, 1935, Serial No. 31,788

8 Claims. (Cl. 111—96)

My present invention relates to gardening tools and implements, and has particular reference to tools utilized for facilitating the feeding of fertilizer to trees, shrubs, and lawns.

It has heretofore been difficult to apply fertilizer beneath the surface of the ground so as to directly reach the soil portions to be fertilized, and it has been usual to make holes in the ground by means of crowbars or earth augers, and then to fill the holes with fertilizer. These methods entail a great deal of labor, and have the further disadvantage that it is difficult to prevent movement of the soil after the hole has been made, whereby the hole tends to fill up before the fertilizer can be inserted therein.

It is the principal object of my invention to devise a simple construction of gardening tool which facilitates the positioning of fertilizer at the points most effective for producing the desired results.

It is a further object of my invention to provide a construction which is portable, readily manufactured and assembled, is easily manipulated, and produces the desired results with a minimum of labor.

It is an additional object of my invention to provide a construction which may be utilized for applying solid fertilizer in the manner described, and is equally efficacious for the application of liquid solutions of fertilizer material.

With the above and other objects and advantageous features in view, my invention consists of a novel arrangement of parts more fully disclosed in the detailed description following, in conjunction with the accompanying drawing, and more specifically defined in the claims appended thereto.

Referring to the drawing,

Fig. 1 is an elevation of the novel gardening tool;

Fig. 2 is a central vertical section thereof on the line 2—2 of Fig. 1;

Fig. 3 is a section on the line 3—3 of Fig. 2, and

Fig. 4 is a detailed sectional view of the lower end of Fig. 1, the parts being in position for the distribution of fertilizer.

It has been found advisable to provide a simple gardening tool which will make the insertion of fertilizer around the roots of trees and shrubs and below the surface of lawns a relatively simple, quick, and easy process. To this end I have devised a construction which consists of a central hollow post which may be fed the fertilizer from a reservoir or supply bag attached thereto in any suitable manner, the hollow post being adapted to be forced into the ground and below the surface to a desired extent, by means of foot or hand pressure, the end of the hollow post having a self seating self centering valve at the end thereof, which further functions as a penetration point, whereby the valve may be moved to open position after the post has been inserted in the ground, for permitting outflow of fertilizer from within the hollow post to fill the hole produced by its penetration in the ground. Preferably, the fertilizer reservoir is in the form of a flexible bag mounted around the center post, and the valve is controlled from the upper end of the post by means of a rigid connecting rod or the like, whereby hardening of the fertilizer may be overcome when it is in the supply bag, by pressing the bag gently with the fingers, and is overcome when in the central post, by movement of the connecting rod, which thus additionally functions as an agitating means.

Referring to the drawing, the preferred embodiment of my invention includes a central hollow post 10 which has a hollow tip portion 11 secured thereto as by means of a sleeve 12 threadedly mounted on the contiguous post and tip ends. The central post has a plurality of openings 13 in the lower portion thereof for permitting fertilizer to enter therein from a fertilizer container 14 which is preferably made of flexible material such as impregnated textile material or the like, the lower end of the container 14 being secured to the post 10 above the sleeve 12 by means of a suitable clamp 15 and the upper end of the bag having a flap 16 having an opening 17 reenforced by a metal eyelet 18 and adapted to be seated over an upstanding boss 19 of a cap 20 threadedly seated upon the upper end of the post 10. As best shown in Figs. 2 and 4, the end of the tip 11 is generally curved as indicated at 21 and is closed by a self seating tapered valve 22, the inner portion 23 thereof being tapered to always be centered in the open end of the tip 11, and the outer portion 24 being tapered to facilitate insertion of the tip end into the ground and to act as a penetrating point therefor. A valve connecting rod 25 extends upwardly from the valve 22 and through the tip and central post and then through the cap 20 and boss 19, the end of the valve connecting rod having a manually engageable button 26 threaded thereon or otherwise attached thereto, a coil spring 27 extending between the button and the cap 20 so as to resiliently urge the valve through its connecting rod to closed position, and to lock the flap 16 of the container 14 in place. The sleeve 12 is preferably formed, as indicated in Fig. 1, with two integral arms 28, having upper surfaces 29 for engagement by the foot of an operator, and the cap 20 has two handles 30 formed integral therewith, and adapted to be grasped by the hands of the operator. The flexible container 14 may, if desired, have strings 31 or other securing means attached thereto, for the purpose of tying the upper end of the container 14 so as to keep the fertilizer therein, if desired. The operation of the novel garden tool may now be explained. The operator fills the container 14 with dry fertilizer, and then presses the tip end 11 into the ground at the desired place, pressing downwardly with his foot on an arm 28 and with his hands on the handles 30, whereby the penetrating point of the valve and the curved end of the tip permits easy penetrating movement of the tool. When the tool has penetrated to a sufficient depth the operator then presses on the button 26, thus moving the end of the valve away from the tip, and, as indicated in Fig. 4, permitting release of the fertilizer, which descends by means of gravity into the opening, the tool being gradually withdrawn so as to completely fill the opening with fertilizer. If desired, the tool may be rocked on the arms 29 as a fulcrum, thus enlarging the opening produced below the ground so as to increase the amount of fertilizer fed thereto, or the whole tool may be moved back and forth by a swinging or rotary motion so as to produce as large a recess in the ground as desired.

Instead of using gravity it is possible to employ compressed air by attaching a compressed air nipple to the hollow post, and making such other necessary changes as will appear evident to any skilled mechanic, or liquid solutions may be fed into the ground by inserting the end of a solution hose into the container, or by inserting the end of a hose into the container to wash down and to dissolve the solid fertilizer added or placed in the container, or by attaching the hose connection to the post or handle, as the handle is preferably hollow to reduce weight and to facilitate circulation of air through the hollow post to keep it and the material in the post and the container dry.

If the dry fertilizer packs in the container, it may be readily broken up by grasping the outside of the container with the hand and pressing; the up and down movement of the connecting rod also acts as an agitating means for preventing packing or caking of the fertilizer in the center post and the hollow tip. The self seating valve automatically returns to its seat upon release of pressure upon the button 26 so as to completely seal the end of the penetrating point 11, it being preferred that the opening at the end of the penetrating tip be shaped to act as a valve seat for cooperating with the tapered inner end of the valve 22.

The parts are preferably made with threaded connections, to facilitate assembly and replacements and to permit shipment of the parts in a dismantled state so as to ensure compactness in shipments. Moreover, different interchangeable lengths of penetrating tips may be provided, and different lengths of connecting rods to match, to provide for different depths of penetration.

While I have described a specific application of my invention to a gardening tool, it is obvious that the principle of the invention may be applied to other tools, for use in supplying any material or any solution to a recess below a surface, and that the material used for the various parts, the shape of the various parts, and their relative sizes, and functions, may be changed to meet the desires for different types of feeding tools having surface penetrating points without departing from the scope and the spirit of the invention as defined by the appended claims.

I claim:

1. In combination, a hollow center post having a penetrating tip, means for supplying material to the interior thereof comprising a material container mounted on said post and inlet openings extending through the lower end of said post, means associated with said post for applying manual pressure thereto, and manually operable valve means at the end of the post tip for permitting controlled outflow of material from said post tip end.

2. In combination, a hollow center post having a penetrating tip, means for supplying material to the interior thereof, comprising a material container mounted on said post and inlet openings extending through the lower end of said post, means associated with said post for applying manual pressure thereto, means for agitating material in said hollow center post, and manually operable valve means at the end of the post tip for permitting controlled outflow of material from said post tip end.

3. In combination, a hollow center post having a penetrating tip, means for supplying material to the interior thereof comprising a material container mounted on said post and inlet openings extending through the lower end of said post, a cap on the upper end of said post, a valve seat on the lower end of said post, a self seating valve on said valve seat, a connecting rod attached to said valve and extending through said post and said cap, a manually engageable portion on the end of said rod, and a spring contacting said portion and said cap for normally urging said valve to closed position.

4. In combination, a hollow center post having a detachably mounted penetrating tip, means for supplying material to the interior thereof comprising a material container mounted on said post and inlet openings extending through the lower end of said post, a cap on the upper end of said post, a valve seat on the lower end of said post, a self seating valve on said valve seat, a connecting rod attached to said valve and extending through said post and said cap, a manually engageable portion on the end of said rod, and a spring contacting said portion and said cap for normally urging said valve to closed position.

5. In combination, a hollow center post having a detachably mounted penetrating tip, manually engageable pressure elements mounted adjacent said penetrating point, means for supplying material to the interior thereof comprising a material container mounted on said post and inlet openings extending through the lower end of said post, a cap on the upper end of said post, a valve seat on the lower end of said post, a self seating valve on said valve seat, a connecting rod attached to said valve and extending through said post and said cap, a manually engageable portion on the end of said rod, and a spring contacting said portion and said cap for normally urging said valve to closed position.

6. In combination, a hollow center post having a detachably mounted penetrating tip, manually engageable pressure elements mounted adjacent said penetrating point, means for supplying material to the interior thereof, a cap on the upper end of said post, handles at the upper end of the post, a conical valve seat on the lower end of said post, a self seating valve on said valve seat, a connecting rod attached to said valve and extending through said post and said cap, a manually engageable portion on the end of said rod, and a spring contacting said portion and said cap for normally urging said valve to closed position.

7. In combination, a hollow center post having a detachably mounted penetrating tip, manually engageable pressure elements mounted adjacent said penetrating point, means for supplying material to the interior thereof, a cap on the upper end of said post, handles at the upper end of the post, a conical valve seat on the lower end of said post, a self seating valve on said valve seat, a connecting rod attached to said valve and extending through said post and said cap, a manually engageable portion on the end of said rod, and a spring contacting said portion and said cap for normally urging said valve to closed position.

8. In combination, a hollow center post having a detachably mounted penetrating tip, manually engageable pressure elements mounted adjacent said penetrating point, means for supplying material to the interior thereof, comprising a material container mounted on said post and inlet openings extending through said post, a cap on the upper end of said post, a conical valve seat on the lower end of said post, a self seating valve on said valve seat, a connecting rod attached to said valve and extending through said post and said cap, a manually engageable portion on the end of said rod, and a spring contacting said portion and said cap for normally urging said valve to closed position.

CHARLES R. FISH, Jr.